(12) United States Patent
Byers et al.

(10) Patent No.: US 12,162,317 B2
(45) Date of Patent: Dec. 10, 2024

(54) RETENTION MOUNT FOR TRAILER CORD

(71) Applicant: MORRYDE INTERNATIONAL, INC., Elkhart, IN (US)

(72) Inventors: Darrell Byers, Topeka, IN (US); Christopher Taylor, Elkhart, IN (US)

(73) Assignee: MORRYDE INTERNATIONAL, INC., Elkhart, IN (US)

( * ) Notice: Subject to any disclaimer, the term of this patent is extended or adjusted under 35 U.S.C. 154(b) by 473 days.

(21) Appl. No.: 17/520,125

(22) Filed: Nov. 5, 2021

(65) Prior Publication Data
US 2022/0144029 A1 May 12, 2022

Related U.S. Application Data

(60) Provisional application No. 63/110,468, filed on Nov. 6, 2020.

(51) Int. Cl.
| | | |
|---|---|---|
| *B60D 1/62* | (2006.01) | |
| *B60R 16/02* | (2006.01) | |
| *B65H 75/34* | (2006.01) | |
| *B60D 1/64* | (2006.01) | |
| *B65H 75/36* | (2006.01) | |

(52) U.S. Cl.
CPC ............ *B60D 1/62* (2013.01); *B60R 16/0215* (2013.01); *B60D 1/64* (2013.01); *B65H 75/34* (2013.01); *B65H 75/366* (2013.01)

(58) Field of Classification Search
CPC .... B60D 1/62; B60D 1/58; B60D 1/64; B60R 16/0215; B60R 16/02; F16B 21/18; F16B 21/10; B65H 75/34; B65H 75/366
See application file for complete search history.

(56) References Cited

U.S. PATENT DOCUMENTS

| | | | | |
|---|---|---|---|---|
| 3,295,812 | A * | 1/1967 | Schneider | F16B 2/246 24/339 |
| 4,033,276 | A * | 7/1977 | Barr | B63C 9/22 248/316.4 |
| 4,573,011 | A * | 2/1986 | Rochat | B07C 5/344 324/750.04 |
| 5,209,439 | A * | 5/1993 | Coll | H02G 7/056 248/65 |
| 6,622,252 | B1 * | 9/2003 | Klaassen | G06F 1/3203 713/320 |
| 6,708,934 | B2 * | 3/2004 | Brueske | B65H 75/366 248/89 |
| 11,447,080 | B2 * | 9/2022 | Luthi | B60R 16/0215 |
| 2007/0215759 | A1 * | 9/2007 | Heegaard | A61M 5/1418 248/90 |
| 2012/0318944 | A1 * | 12/2012 | Ernst | A47F 7/005 403/119 |

* cited by examiner

*Primary Examiner* — Tan Le
(74) *Attorney, Agent, or Firm* — MARSHALL, GERSTEIN & BORUN LLP

(57) ABSTRACT

A retention mount for an electrical cord of a trailer is described that includes a body, a tab extending away from the body, and a plurality of arms extending away from the body. The tab defines an opening configured to receive a plug of the electrical cord therethrough and the plurality of arms each include a retention portion extending outwardly from the body, such that a cable portion of the electrical cord can be wrapped around the plurality of arms with the retention portions thereof retaining the cable portion on the retention mount. The retention mount can be removably or irremovably coupled to a structure of a vehicle.

20 Claims, 7 Drawing Sheets

RETENTION MOUNT FOR TRAILER CORD

CROSS-REFERENCE TO RELATED APPLICATION

This application claims the priority benefit of U.S. Provisional Application No. 63/110,468, filed Nov. 6, 2020, which is hereby incorporated by reference in its entirety.

FIELD OF THE DISCLOSURE

The present disclosure generally relates to cord retention mounts and, more particularly, to cord retention mounts for trailers.

BACKGROUND

Electrical cords that connect trailers to a towing vehicle can pose several issues when unattached to the towing vehicle. When not in use, the electrical cord can be left to hang from the trailer and, to provide sufficient clearance for a variety of towing vehicles and configurations, the electrical cord can be long enough to reach the ground from the trailer. Due to this configuration, the electrical cord can be damaged, get in the way of people working around the trailer, or even provide a bridge to bugs and rodents to climb up into the trailer.

SUMMARY

In accordance with a first aspect, a retention mount for an electrical cord of a trailer is described herein that includes a body, a tab extending away from the body, and a plurality of arms extending away from the body. The tab defines an opening that is configured to receive a plug of the electrical cord therethrough and the plurality of arms each include a retention portion extending outwardly from the body, such that a cable portion of the electrical cord can be wrapped around the plurality of arms with the retention portions thereof retaining the cable portion on the retention mount.

According to some forms, the retention mount can include one or more of the following aspects: the plurality of arms can extend outwardly from an outer edge of the body; the plurality of arms can include at least three arms arrayed around a perimeter of the body; the body can be planar; the opening defined in the tab can include a radial notch; the body, the tab, and the plurality of arms can have an integral construction; the retention mount can include one or more rubber bumpers coupled to the body on a side thereof opposite the plurality of arms to cushion the body against a mounting surface, the body can include one or more wings extending outwardly from a main portion thereof, where individual ones of the one or more rubber bumpers are coupled to one of the one or more wings; the one or more wings can be coplanar with the main portion of the body; the arms can each include a base portion that extends away from the body and the retention portion can be a flange extending outwardly from the base portion; the arms can extend outwardly from the body at a generally constant angle; or the retention mount can include a magnet mounted to the body on a side thereof opposite the plurality of arms, where the magnet is configured to removably secure the retention mount to a structure of a vehicle.

According to further aspects, a retention mount having any of the above forms can be provided in combination with a trailer, hitch, or towing vehicle, where the retention mount is irremovably secured to the trailer, hitch, or towing vehicle. In these forms, the retention mount can be rotatably mounted to the trailer. In further forms, the combination can include a lock to restrict rotational movement of the retention mount relative to the trailer, hitch, or towing vehicle.

DETAILED DESCRIPTION

Figure 1:
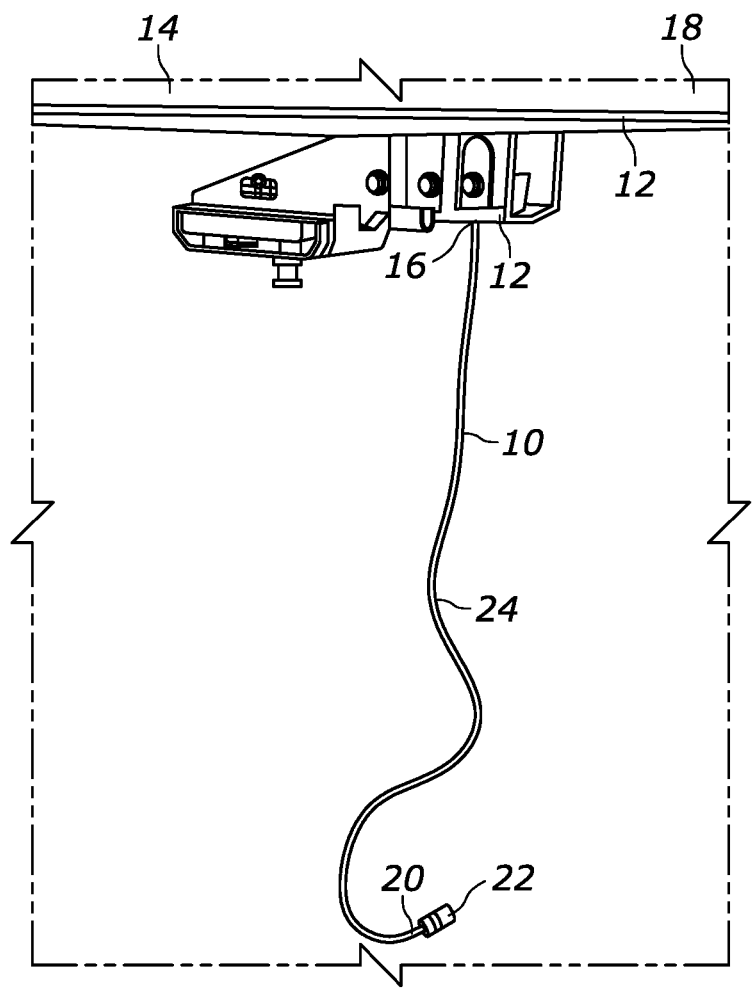
FIG. 1 is a sectional view of a trailer showing an electrical cord in an unused configuration.
Figure 2:
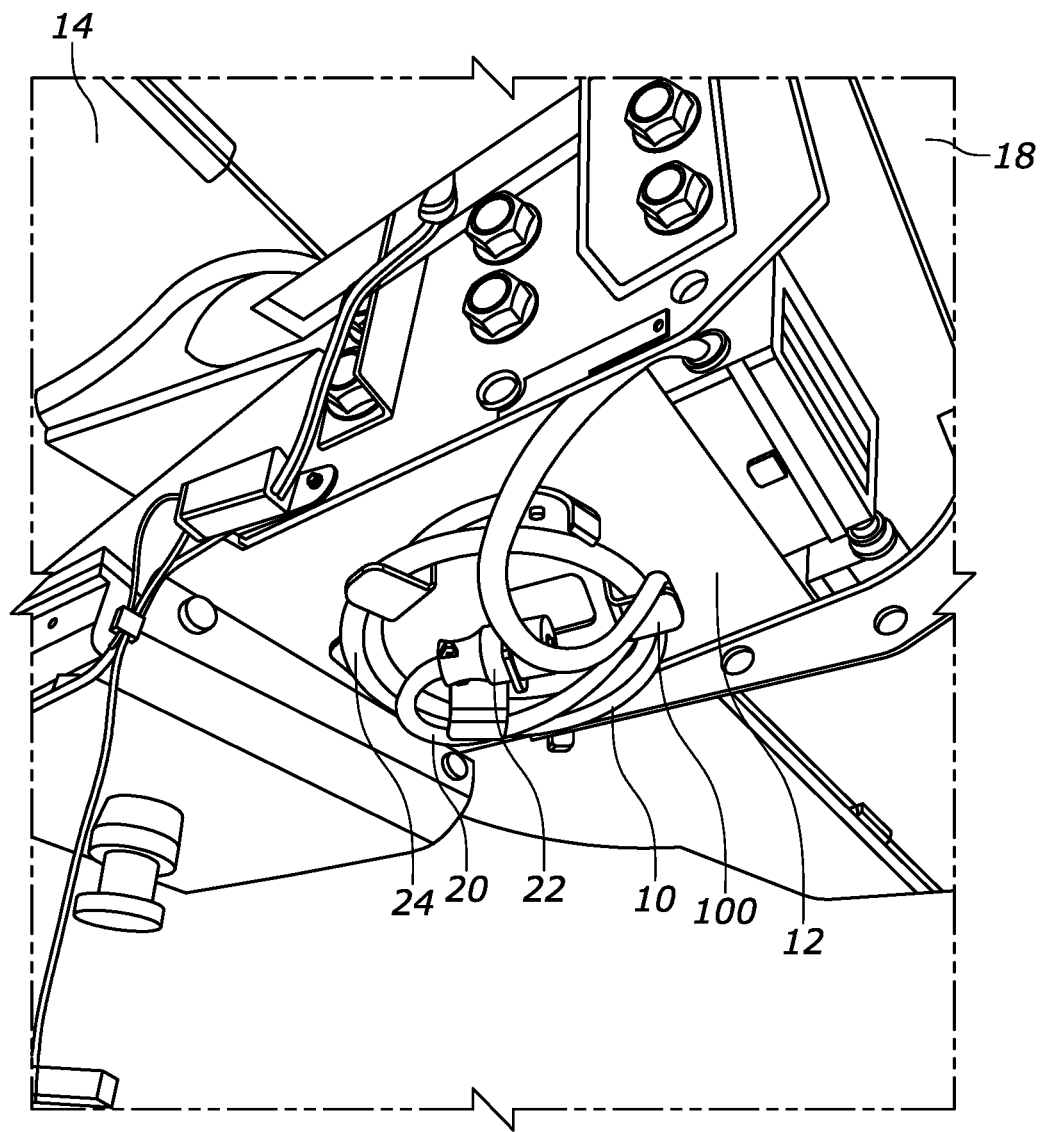
FIG. 2 is a bottom perspective view of a trailer having a retention mount coupled thereto in accordance with various embodiments.

A retention mount for a trailer is described herein that allows an electrical cord to be stowed in a coiled position when not in use. The retention mount can be removably mounted to a structure of a vehicle, such as mounted to the trailer or a hitch therefor, or can be irremovably secured thereto. The retention mount includes an opening to receive a plug of the electrical cord and arms to have the cable portion of the electrical cord wrapped therearound. In some examples, the retention mount can be rotated with respect to the structure of the vehicle to aid with wrapping the cable portion of the electrical cord around the arms.

Turning now to FIGS. 1-9, an example retention mount 100 is shown that is configured to retain an electrical cord 10 in a coiled configuration therearound and be mounted to a structure 12 of a vehicle 14. The electrical cord 10 includes a first end 16 extending from a trailer 18 and a second end 20 having a plug 22 with a cable portion 24 extending therebetween. In some examples, the vehicle 14 can be a towing vehicle or the trailer 18. In further examples, the structure 12 of the vehicle 14 can be a hitch, a pin box, a body of the vehicle 14, such as a wall, bed, or the like, or other components mounted to the body.

Figure 3:
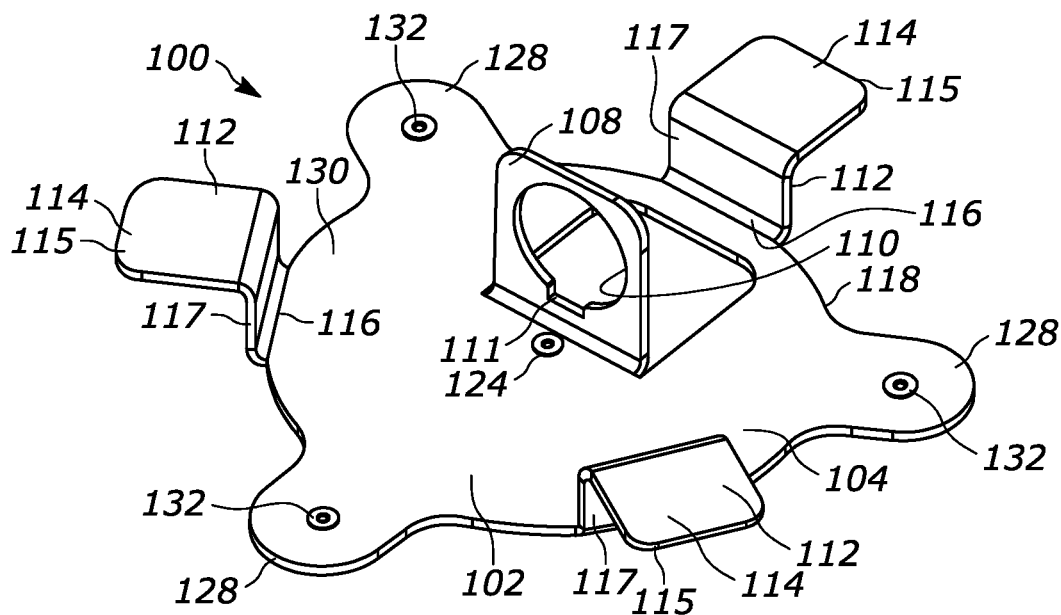
FIG. 3 is a bottom perspective view of a first example retention mount in accordance with various embodiments.
Figure 4:
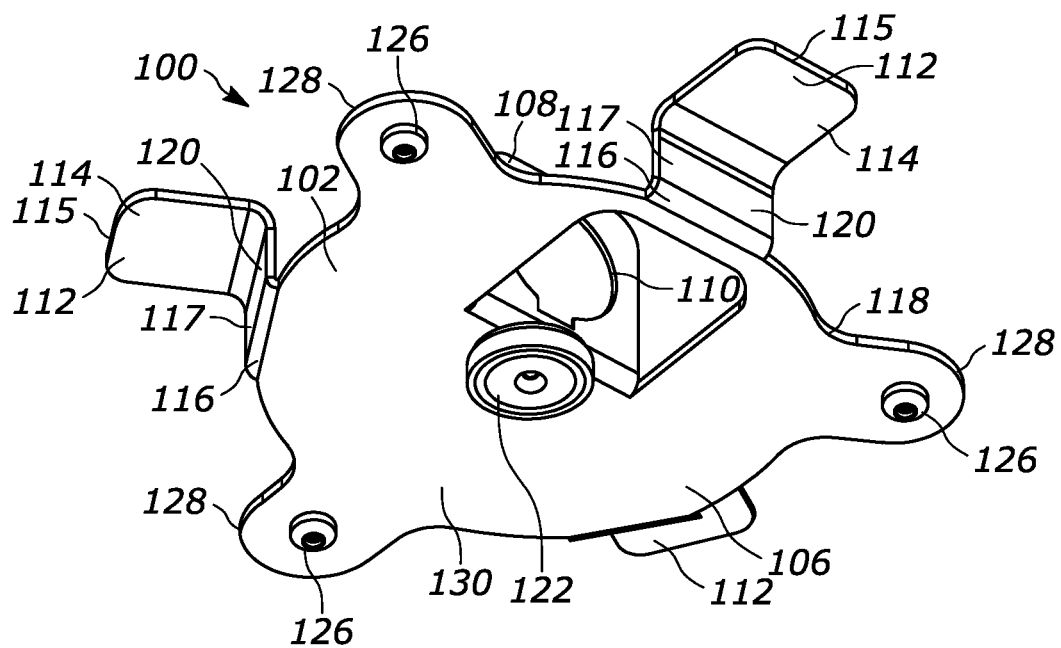
FIG. 4 is a top perspective view of the retention mount of FIG. 3.

Details of an example retention mount 100 are shown in FIGS. 3 and 4. The retention mount 100 includes a body 102 having a top surface 104 and a bottom surface 106. In one example, the body 102 can have a planar configuration as shown. The retention mount 100 further includes a tab 108 that extends away from the bottom surface 106 of the body and defines an opening 110 extending therethrough. The opening 110 is configured to receive the plug 22 of the electrical cord 10 therein to retain the plug 22 in a stored configuration. If desired, the opening 110 can include one or more radial notches 111 to be complementary to a perimeter structure of the plug 22, so that the plug 22 can be freely inserted into the opening 110. The tab 108 can be perpendicular with respect to the body 102 or can extend along an acute or obtuse angle with respect thereto. Alternatively, the tab 108 can take the form of an enclosure having a cavity sized to receive the plug 22.

As shown, the retention mount 100 further includes a plurality of arms 112 configured to have the cable portion 24 of the electrical cord 10 wrapped therearound. Pursuant to this, each of the plurality of arms 112 includes a retention portion 114 that at least partially extends outwardly with respect to the body 102, such that a distal end 115 of each of the arms 112 is disposed outwardly of a proximal end 116.

In one example as shown in FIGS. 3 and 4, each of the arms 112 can have a bent configuration including a base portion 117 that extends away from the bottom surface 106 of the body 102 and the retention portion 114 can be a flange that extends outwardly from the base portion 117. For example, the flange 114 can extend between 0-45 degrees, between 0-30 degrees, between 0-10 degrees, etc. with respect to the body 102. The base portion 116 can be perpendicular with respect to the body 102 or can extend along an acute or obtuse angle with respect thereto.

Figure 8:
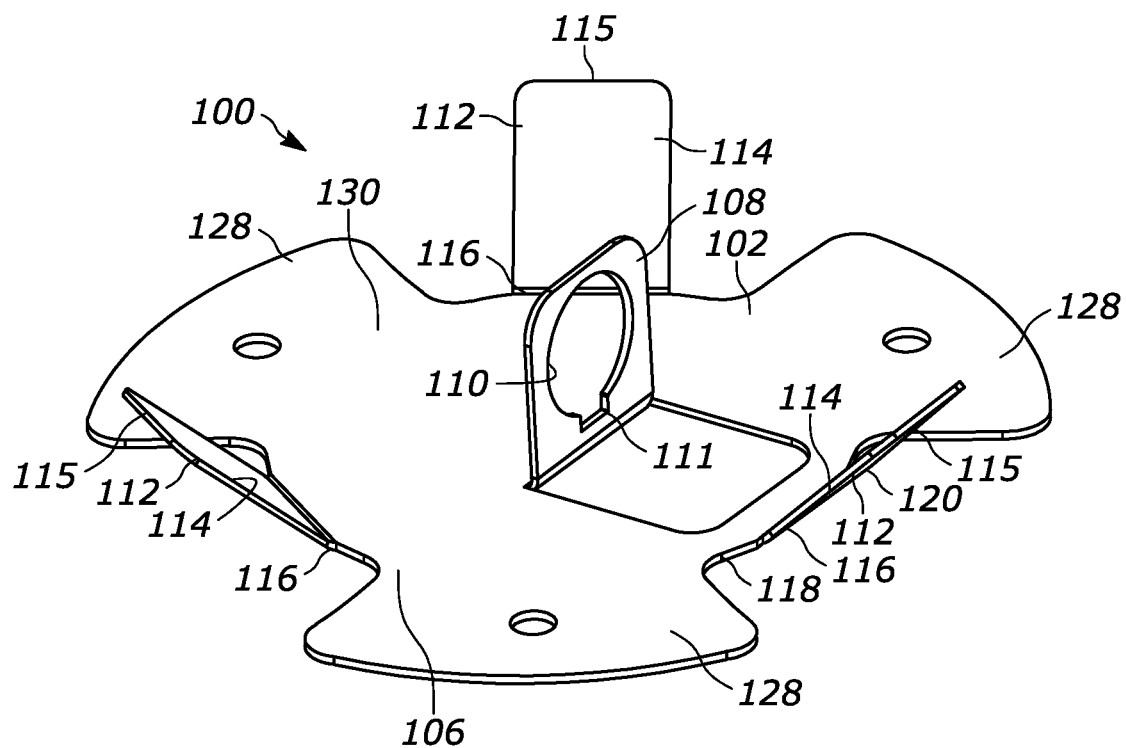
FIG. 8 is a bottom perspective view of a second example retention mount in accordance with various embodiments.
Figure 9:
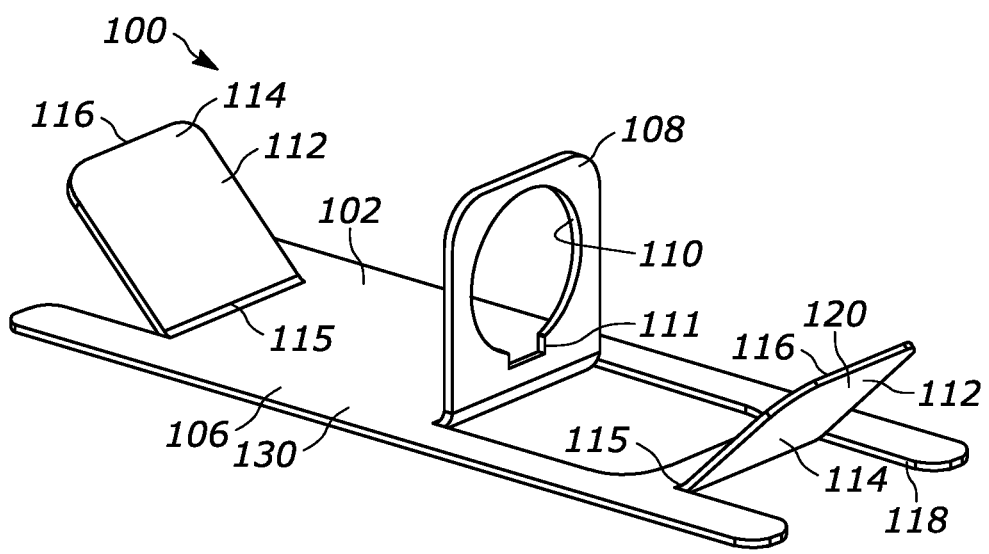
FIG. 9 is a bottom perspective view of a third example retention mount in accordance with various embodiments.

In the illustrated form, the retention portion 114 is generally, e.g., 0-5 degrees, parallel with the body 102. In another example, as shown in FIGS. 8 and 9, the arms 112 can extend away from body 102 at a generally constant angle. In this form, the entire arm 112 provides the retention portion 114. The arms 112 can extend at any desired angle, such as generally 45 degrees, or within a range of between 15-60 degrees, 25-50 degrees, etc.

The retention mount 100 can include any desired number of arms 112. For example. The retention mount 100 can include 2 arms 112 as shown in FIG. 9 or 3 arms 112 as shown in FIGS. 1-8. In other examples, the retention mount 100 can include 4 arms, 5 arms, or more as desired and as suitable for a sized of the mount 100 and a length of the electrical cord 10. Further, the arms 112 can be symmetrically arrayed about the body 102. In the illustrated form, the arms 112 can extend from a perimeter edge 118 of the body 102. Further, it will be understood that the arms 112 can have any of the configurations described herein regardless of the number of arms.

The body 102 can have any desired shape, such as generally circular, as shown, triangular, square, or other polygonal and/or curvilinear shapes. In one example form, the portions of the retention mount 100 can integrally formed, such that the body 102, the tab 108, and the arms 112 can be made from a single piece of material. For example, the body 102 and arms 112 can be cut from a piece of suitable material. Thereafter, the tab 108 and opening 110 can be cut from the body 102 and the tab 108 and arms 112 can be bent to desired orientations, with the arms 112 having a double bend configuration to form the second, flange portions 116. The arms 112 can include more bends to accommodate other shapes if desired. Of course, one or more portions of the retention mount 100 can be fixed or otherwise coupled together by any suitable process, such as welding.

Figure 5:
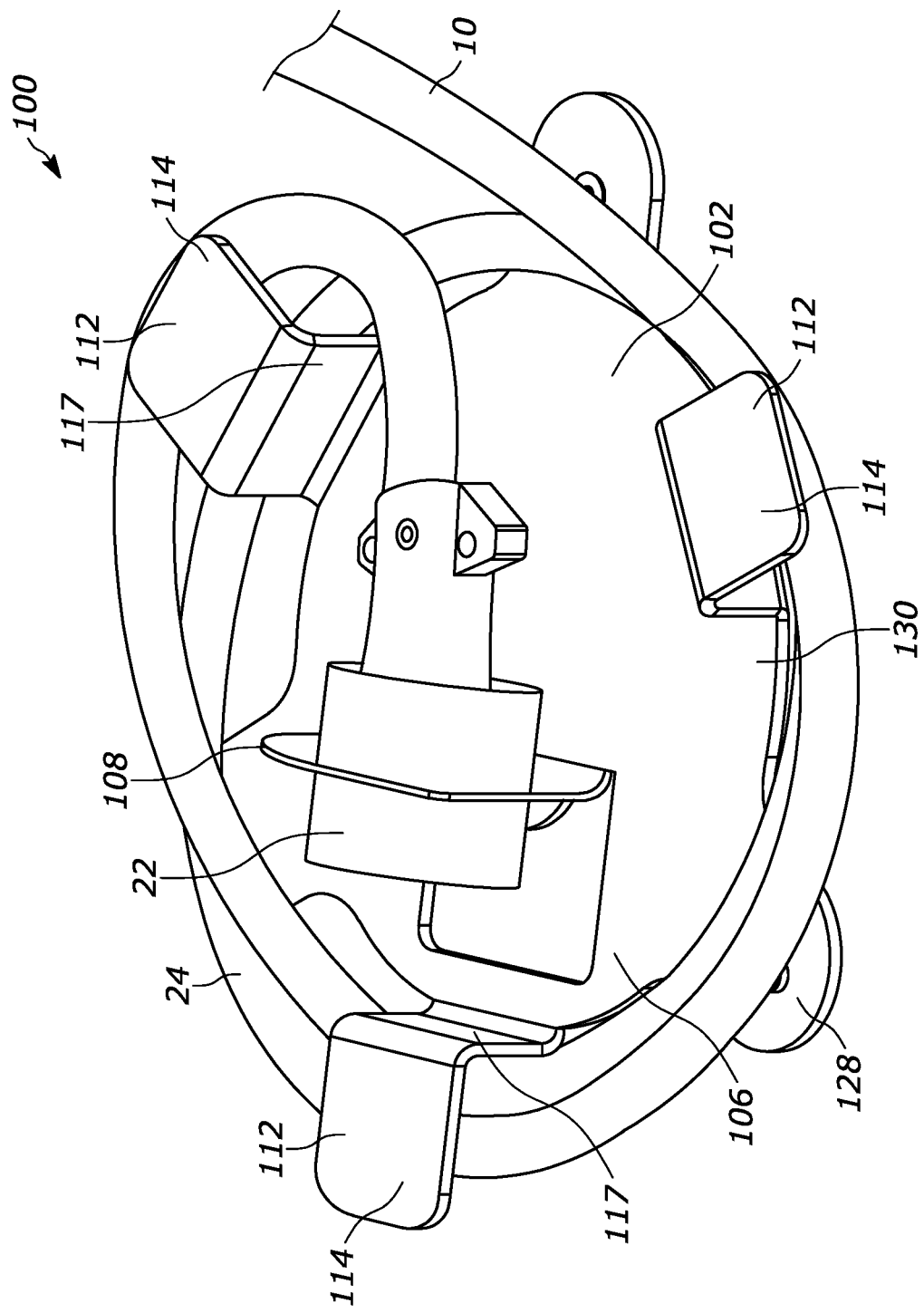
FIG. 5 is a bottom perspective view of the retention mount of FIG. 3 having an electrical cord retained thereon.
Figure 6:
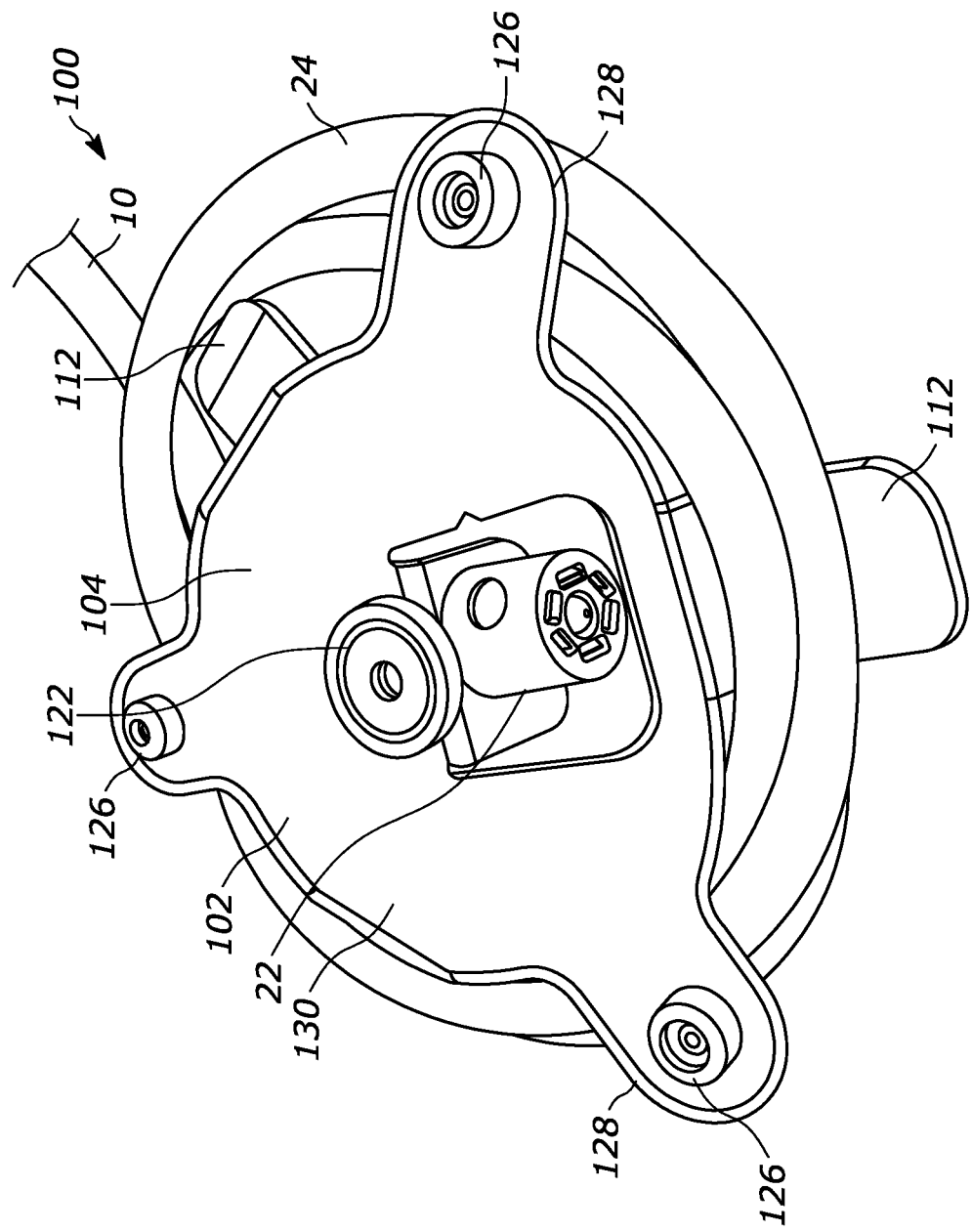
FIG. 6 is a top perspective view of the retention mount of FIG. 3 having an electrical cord retained thereon.

As shown in FIGS. 5 and 6, the tab 108 and the first portion 114 of the plurality of arms 112 establish of depth for the retention mount 100 to receive the cable portion 24 of the electrical cord 10 therearound. So configured, a user can insert the plug 22 into the opening 110 of the tab 108 and wrap the cable portion 24 tightly around an exterior surface 120 of the first portion 114 of the arms 112 to place the electrical cord 10 in a coiled configuration. The second portion 116 of the arms 112 can be sized to extend to or beyond a diameter of the coiled cable portion 24 to prevent the cable portion 24 from slipping off of the arms 112 and retain the cable portion 24 on the retention mount 100 in the coiled configuration. The retention device 100 can be configured to restrict rotational movement when mounted to the structure 12 of the vehicle 14, as described in more detail below.

In one example form as shown in FIGS. 3-6, the retention mount 100 can further include a magnet 122 to thereby removably couple the mount 100 to the structure 12 of the vehicle 10. In this form, the structure 12 can be made from a suitable metal to have the mount 100 securely coupled thereto to hold the electrical cord 10 in the coiled configuration. The magnet 122 can be coupled to the body 102 adjacent to the top surface 104 thereof, so that the tab 108 and arms 112 extend away from the structure 12 when the retention mount 100 is secured thereto with the magnet 122. The magnet 122 can be coupled to the body 102 by any suitable mechanism, such as rivets 124, welding, etc.

In order to protect the vehicle structure 12 from damage, the retention mount 100 can further include one or more bumpers 126 coupled to the body 102 adjacent to the top surface 104 thereof such that the bumpers 126 contact the vehicle structure 12 rather than the body 102. In one example, the body 102 can include wings 128 that extend outwardly from a main portion 130 of the body 102 and the bumpers 126 can be coupled to the wings 128. The bumpers 126 can be secured to the body 102 by any suitable mechanism, including rivets, welding, press-fit plugs 132, etc., and can be made from any suitable material, such as rubber or the like. As such, the wings 128 and the main portion 130 can be coplanar with one another, such that the body 102 has a planar configuration.

So configured, utilizing the retention mount 100 of this form, a user can insert the plug 22 into the tab opening 110 and the cable portion 24 can be wrapped around the arms 112. Thereafter, the user can secure the retention mount 100 to the vehicle structure 12 in a desired location using the magnet 122, which holds the retention mount 100 in a fixed position with respect to the vehicle 14, including rotationally, such that the cord 10 cannot unwind from the retention mount 100. Alternatively, the user can insert the plug 22 into the tab opening 110 either before or after securing the retention mount 100 to the vehicle structure 12, and the rotate the retention mount 100 with it secured to the vehicle structure 12 to wrap the cable portion 24 around the arms 112.

It will be understood that the retention mount 100 can be removably secured to the vehicle structure 12 by any suitable mechanism. For example, the retention mount 100 and vehicle structure 12 can include cooperating locking structure, such as snap-fit, tongue-and-groove, etc., the retention mount 100 can include a suction cup, and/or the vehicle structure 12 can include a container or arm to hold the retention mount 100 in place.

Figure 7:
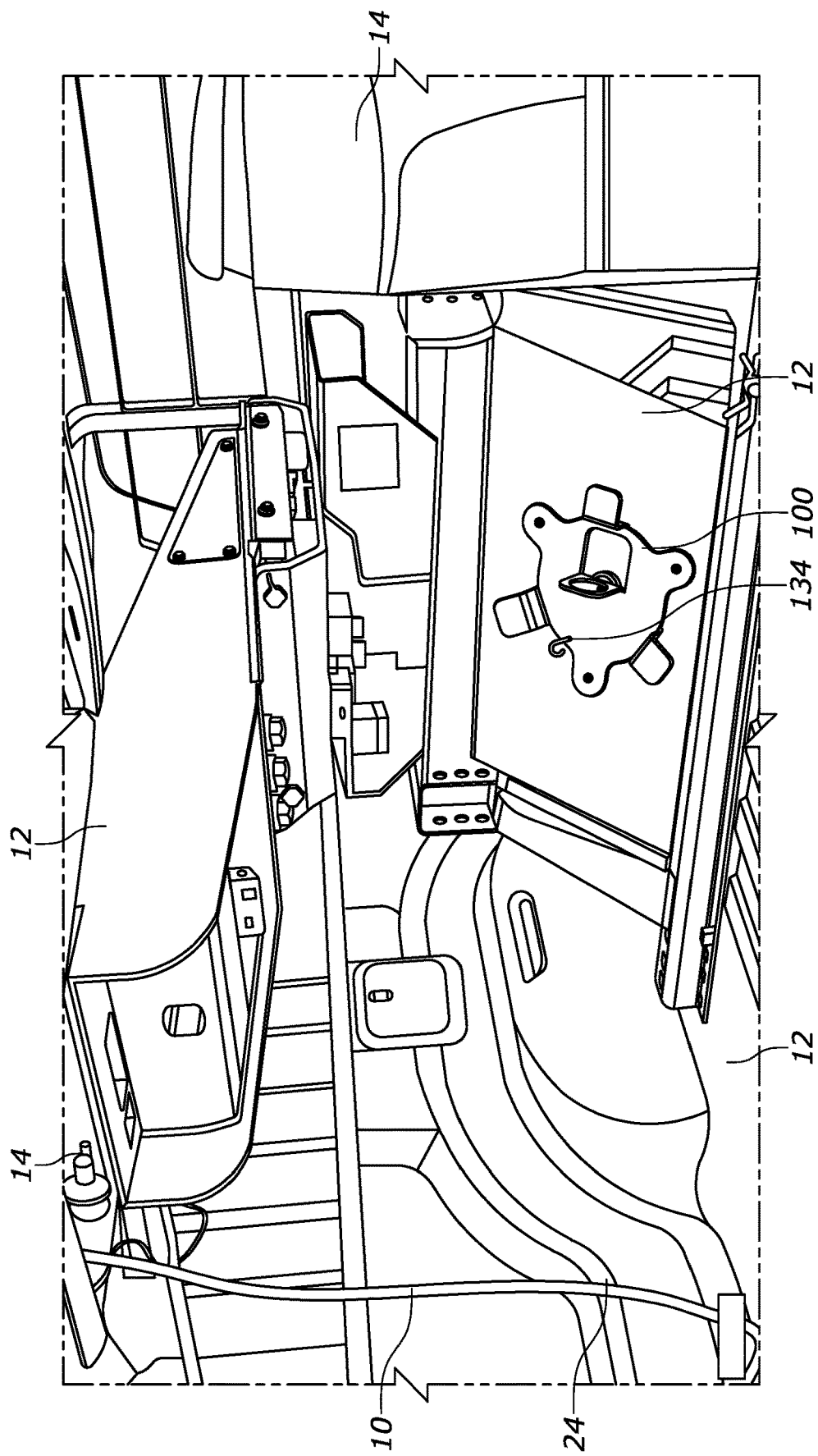
FIG. 7 is a sectional view of a trailer and towing vehicle with a retention mount coupled to a hitch of the towing vehicle in accordance with various embodiments.

In other example forms, such as that shown in FIG. 7, the retention mount 100 can be fixedly secured to the vehicle structure 12, such that the retention mount 100 cannot be removed therefrom. For example, the retention mount 100 can be welded or fastened to the vehicle structure 12 using bolts, rivets, or other fasteners. As discussed above, the vehicle 14 can be a towing vehicle or the trailer 18 and the vehicle structure 12 can be a hitch, a pin box, a body of the vehicle 14, such as a wall, bed, or the like, or other components mounted to the body. The retention mount 100 can be fixed to the vehicle structure 12 without being able to move relative to the structure 12 or, if desired, the retention mount 100 can be rotatably fixed to the vehicle structure 12, such as by bearings or the like. Such a configuration would allow a user to insert the plug 22 into the tab opening 110 and then spin the retention mount 100 to wrap the cable portion 24 around the arms 112. In these forms, the retention mount 100 or vehicle 14 can include a lock 134, such as a pin, latch, or the like, to selectively restrict the retention mount 100 from rotational movement.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A retention mount for a cord, the retention mount comprising:
   a body having an outer perimeter edge, a rear face configured to extend along structure of a vehicle when mounted thereto, and a front face opposite to the rear face;
   a tab extending away from the front face of the body to extend away from the structure of the vehicle when mounted thereto, the tab located in an interior of the body spaced from the outer perimeter edge, the tab defining an opening configured to receive an end of the cord therethrough; and
   a plurality of arms extending away from the front face of the body to extend away from the structure of the vehicle when mounted thereto and arranged around the outer perimeter edge of the body such that the tab is disposed at least partially between the plurality of arms, the plurality of arms each including retention portion extending outwardly from the body, such that a cable portion of the cord can be wrapped around the plurality of arms with the retention portions thereof retaining the cable portion on the retention mount.

2. The retention mount of claim 1, wherein the plurality of arms comprise at least three arms arrayed around the outer perimeter edge of the body.

3. The retention mount of claim 1, wherein the body is planar.

4. The retention mount of claim 1, wherein the opening defined in the tab includes a radial notch.

5. The retention mount of claim 1, wherein the body, the tab, and the plurality of arms have an integral construction.

6. The retention mount of claim 1, further comprising one or more rubber bumpers coupled to the body on a side thereof opposite the plurality of arms to cushion the body against a mounting surface.

7. The retention mount of claim 6, wherein the body further comprises one or more wings extending outwardly from a main portion thereof, individual ones of the one or more rubber bumpers coupled to one of the one or more wings.

8. The retention mount of claim 7, wherein the one or more wings are coplanar with the main portion of the body.

9. The retention mount of claim 1, wherein the plurality of arms each include a base portion extending away from the body, and the retention portion comprises a flange extending outwardly from the base portion.

10. The retention mount of claim 1, wherein the plurality of arms extend outwardly from the body at a constant angle.

11. A retention mount for a cord, the retention mount comprising:
    a body;
    a tab extending away from the body, the tab defining an opening configured to receive an end of the cord therethrough;
    a plurality of arms extending away from the body, the plurality of arms each including retention portion extending outwardly from the body, such that a cable portion of the cord can be wrapped around the plurality of arms with the retention portions thereof retaining the cable portion on the retention mount; and
    a magnet mounted to the body on a side thereof opposite the plurality of arms, the magnet configured to removably secure the retention mount to a structure of a vehicle.

12. The retention mount of claim 1 in combination with a trailer, wherein the retention mount is irremovably secured to the trailer.

13. The combination of claim 12, wherein the retention mount is rotatably mounted to the trailer.

14. An assembly comprising:
    a retention mount for a cord, the retention mount comprising:
    a body;
    a tab extending away from the body, the tab defining an opening configured to receive a plug of the cord therethrough;
    a plurality of arms extending away from the body, the plurality of arms each including retention portion extending outwardly from the body, such that a cable portion of the cord can be wrapped around the plurality of arms with the retention portions thereof retaining the cable portion on the retention mount;
    a trailer, wherein the retention mount is irremovably secured and rotatably mounted to the trailer; and
    a lock to restrict rotational movement of the retention mount relative to the trailer.

15. The retention mount of claim 1 in combination with a hitch, wherein the retention mount is irremovably secured to the hitch.

16. The combination of claim 15, wherein the retention mount is rotatably mounted to the hitch.

17. An assembly comprising:
    a retention mount for a cord, the retention mount comprising:
    a body;
    a tab extending away from the body, the tab defining an opening configured to receive a plug of the cord therethrough;
    a plurality of arms extending away from the body, the plurality of arms each including retention portion extending outwardly from the body, such that a cable portion of the cord can be wrapped around the plurality of arms with the retention portions thereof retaining the cable portion on the retention mount;

a hitch, wherein the retention mount is irremovably secured and rotatably mounted to the hitch; and a lock to restrict rotational movement of the retention mount relative to the hitch.

18. The retention mount of claim 1 in combination with a towing vehicle, wherein the retention mount is irremovably secured to the towing vehicle.

19. The combination of claim 18, wherein the retention mount is rotatably mounted to the towing vehicle.

20. The combination of claim 19, further comprising a lock to restrict rotational movement of the retention mount relative to the towing vehicle.

\* \* \* \* \*